United States Patent
Kim et al.

(10) Patent No.: US 10,665,832 B2
(45) Date of Patent: May 26, 2020

(54) BATTERY PACK COMPRISING BATTERY MODULES MOUNTED IN TWO LAYERS

(71) Applicant: LG CHEM, LTD., Seoul (KR)

(72) Inventors: Hyun Chan Kim, Daejeon (KR); Joo Sung Kim, Daejeon (KR); Na Ri Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 158 days.

(21) Appl. No.: 15/754,360

(22) PCT Filed: Jan. 12, 2017

(86) PCT No.: PCT/KR2017/000396
§ 371 (c)(1),
(2) Date: Feb. 22, 2018

(87) PCT Pub. No.: WO2017/123014
PCT Pub. Date: Jul. 20, 2017

(65) Prior Publication Data
US 2018/0248159 A1    Aug. 30, 2018

(30) Foreign Application Priority Data

Jan. 15, 2016  (KR) .................. 10-2016-0005055

(51) Int. Cl.
*H01M 2/10*    (2006.01)
*H01M 2/20*    (2006.01)
(Continued)

(52) U.S. Cl.
CPC ....... *H01M 2/1077* (2013.01); *H01M 2/1083* (2013.01); *H01M 2/206* (2013.01);
(Continued)

(58) Field of Classification Search
CPC ............ H01M 2/10; H01M 2/12; H01M 2/02; H01M 2/20; H01M 10/42; H01M 10/613
See application file for complete search history.

(56) References Cited

U.S. PATENT DOCUMENTS 5,002,020 A * 3/1991 Kos .......................... B60K 6/22
                                                          123/46 E
9,172,122 B2   10/2015 Yum et al.
(Continued)

FOREIGN PATENT DOCUMENTS

CN        105098112 A      11/2015
EP        2 819 236 A1     12/2014
(Continued)

OTHER PUBLICATIONS

International Search Report (PCT/ISA/210) issued in PCT/KR2017/000396, dated Apr. 14, 2017.
(Continued)

*Primary Examiner* — Kenneth J Douyette
(74) *Attorney, Agent, or Firm* — Birch, Stewart, Kolasch & Birch, LLP

(57) ABSTRACT

The present invention relates to a battery pack including: a plurality of battery modules each including a plurality of battery cells, wherein at least one of the battery modules has a layer structure with the remaining battery modules based on the ground; a battery management system (BMS) mounted adjacent to the battery modules and monitoring and controlling operation of the battery modules; a battery disconnect unit (BDU) mounted adjacent to the battery modules and controlling electrical connection of the battery modules; a base plate having a structure in which the battery modules are mounted on an upper surface thereof and a lower end part thereof is fixed to an external device; and a
(Continued)

pack cover surrounding the battery modules and coupled to an outer periphery of the base plate.

17 Claims, 6 Drawing Sheets

(51) Int. Cl.
  *H01M 10/625*  (2014.01)
  *H01M 10/6551*  (2014.01)
  *H01M 10/6554*  (2014.01)
  *H01M 10/613*  (2014.01)
  *H01M 10/42*  (2006.01)
  *B60L 50/64*  (2019.01)

(52) U.S. Cl.
  CPC ....... *H01M 10/425* (2013.01); *H01M 10/613* (2015.04); *H01M 10/625* (2015.04); *H01M 10/6551* (2015.04); *H01M 10/6554* (2015.04); *B60L 50/64* (2019.02); *Y02T 10/705* (2013.01)

(56) References Cited

U.S. PATENT DOCUMENTS

| | | | |
|---|---|---|---|
| 9,419,261 B2 | 8/2016 | Kim et al. | |
| 9,444,083 B2 | 9/2016 | Yasui et al. | |
| 2008/0311468 A1* | 12/2008 | Hermann | H01M 2/1077 429/120 |
| 2011/0244282 A1 | 10/2011 | Seto et al. | |
| 2013/0228387 A1* | 9/2013 | Lucas | B60K 1/04 180/65.1 |
| 2013/0288094 A1* | 10/2013 | Noh | H01M 2/1077 429/99 |
| 2013/0337299 A1* | 12/2013 | Sugawara | H01M 2/206 429/61 |
| 2014/0315069 A1* | 10/2014 | Kim | H01M 2/1072 429/149 |
| 2014/0322568 A1 | 10/2014 | Sakai et al. | |
| 2015/0010782 A1 | 1/2015 | Tanigaki et al. | |
| 2015/0171401 A1 | 6/2015 | Kim et al. | |
| 2015/0244043 A1 | 8/2015 | Yum et al. | |
| 2017/0047563 A1 | 2/2017 | Lee et al. | |

FOREIGN PATENT DOCUMENTS

| | | |
|---|---|---|
| JP | 2007-311172 A | 11/2007 |
| JP | 2013-110119 A | 6/2013 |
| JP | 2016-139522 A | 8/2016 |
| KR | 10-2005-0048275 A | 5/2005 |
| KR | 10-2012-0023788 A | 3/2012 |
| KR | 10-2013-0068975 A | 6/2013 |
| KR | 10-2014-0006410 A | 1/2014 |
| KR | 10-2014-0126535 A | 10/2014 |
| KR | 10-2015-0059515 A | 6/2015 |
| KR | 10-2015-0081579 A | 7/2015 |
| KR | 10-2015-0100471 A | 9/2015 |

OTHER PUBLICATIONS

European Search Report for Appl. No. 17738643.0 dated Jun. 5, 2018.

\* cited by examiner

【Figure 1】
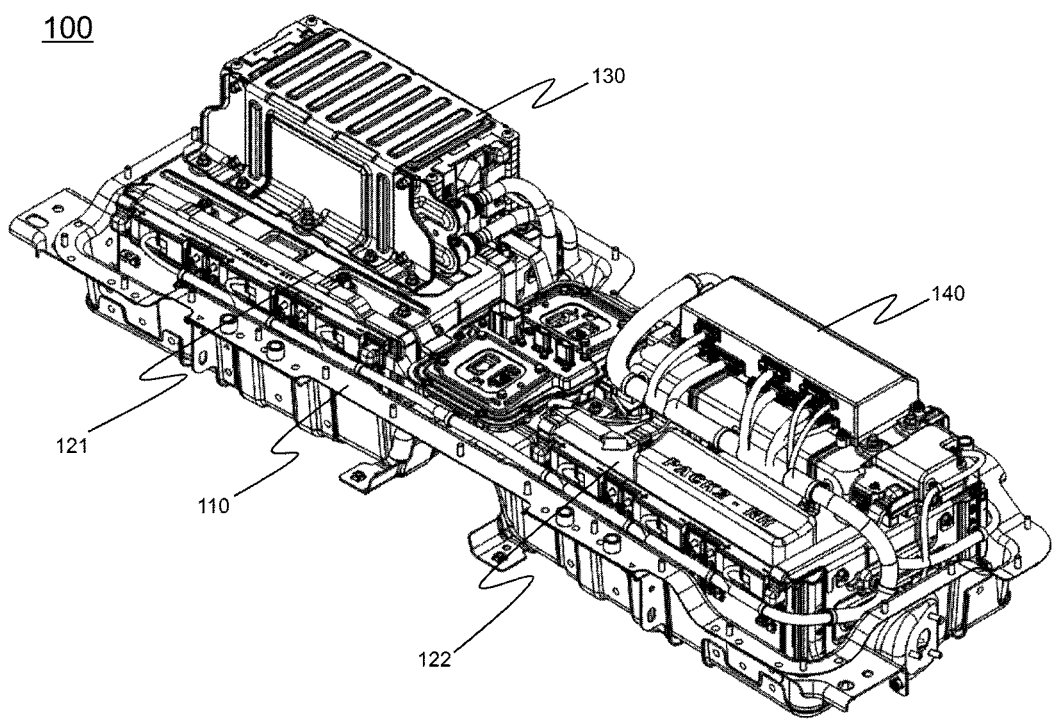

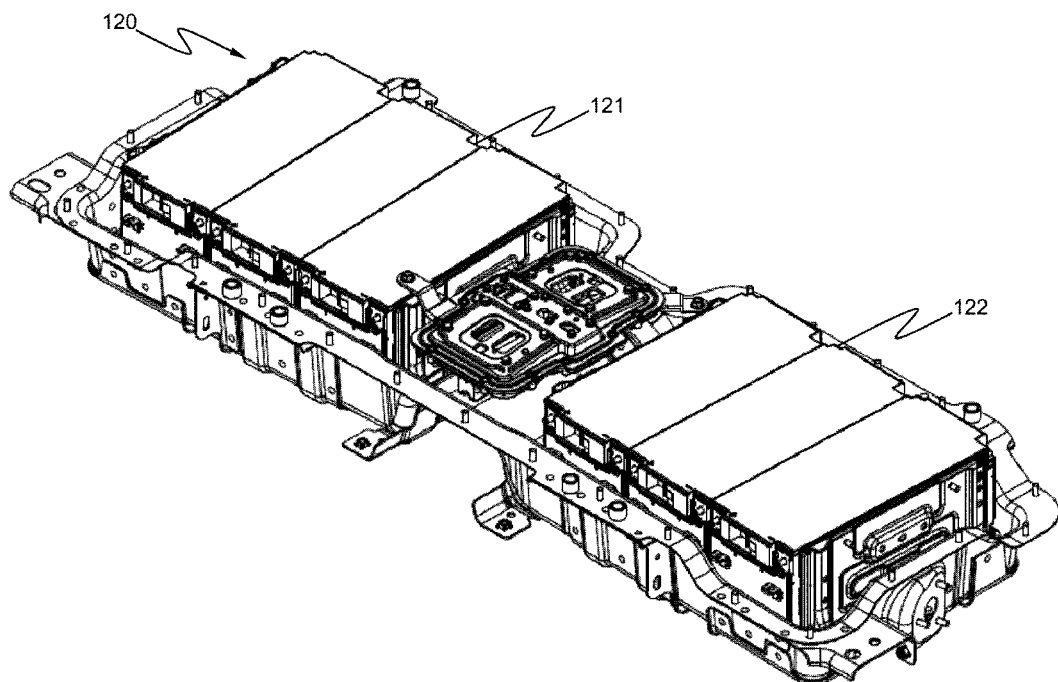
【Figure 2】

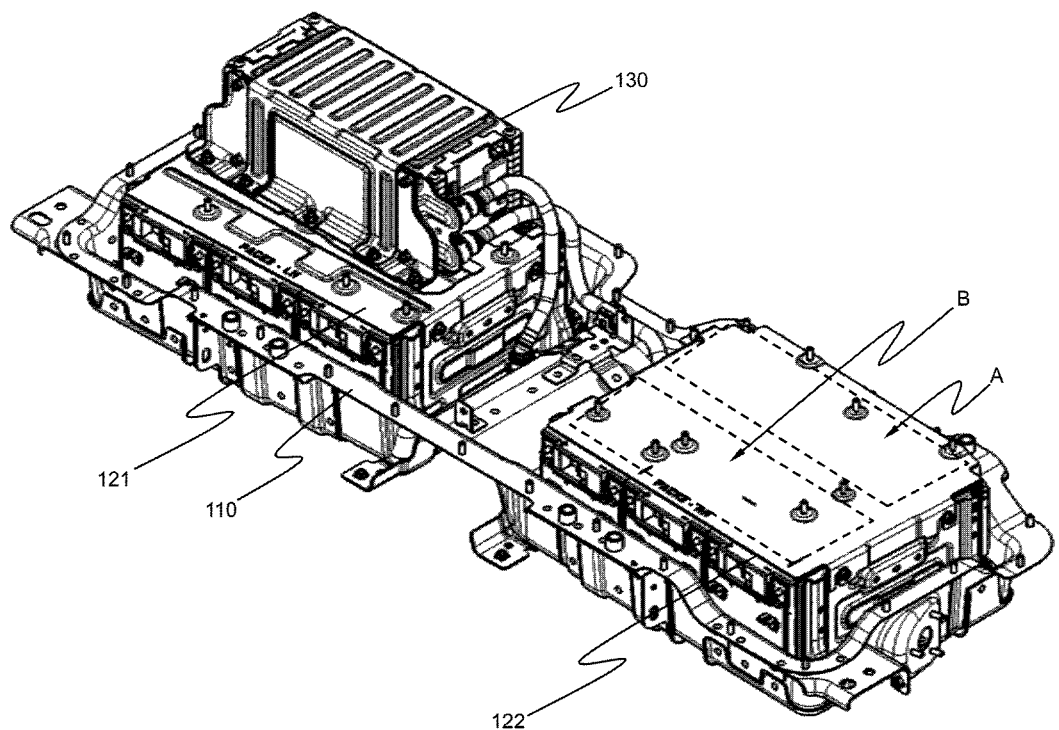
【Figure 3】

[Figure 4]
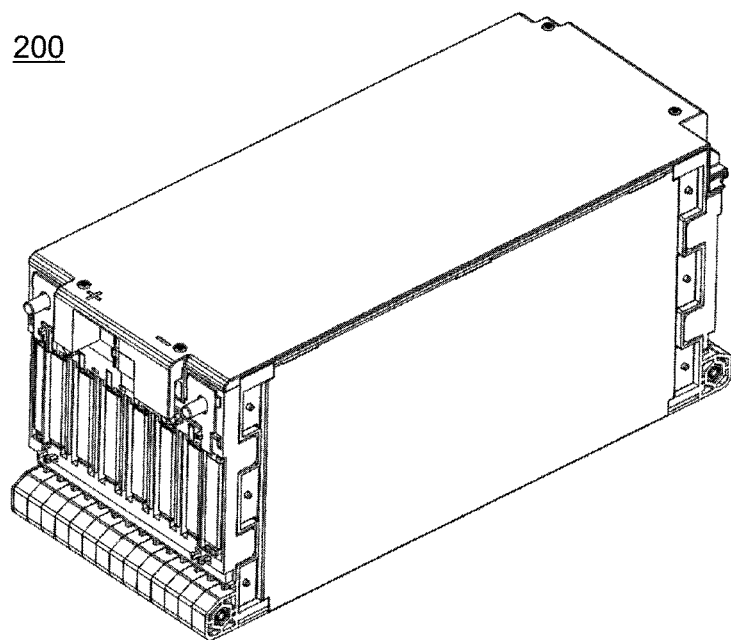

【Figure 5】
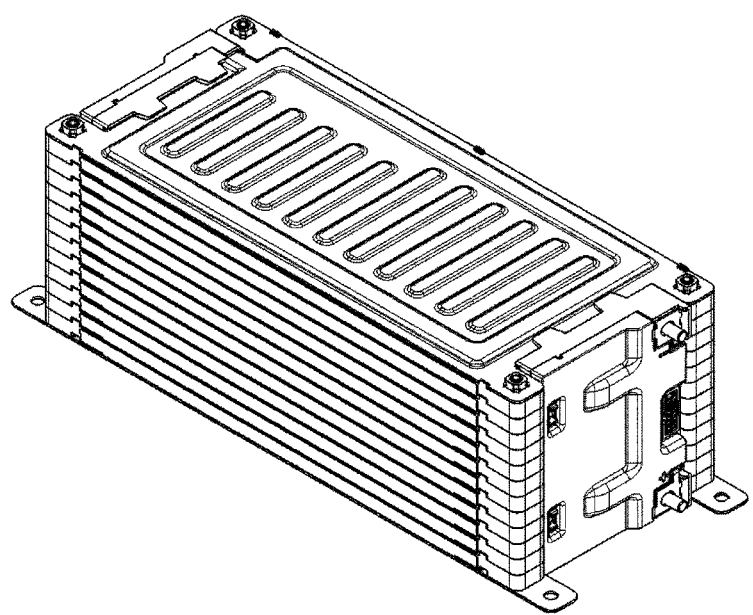

[Figure 6]
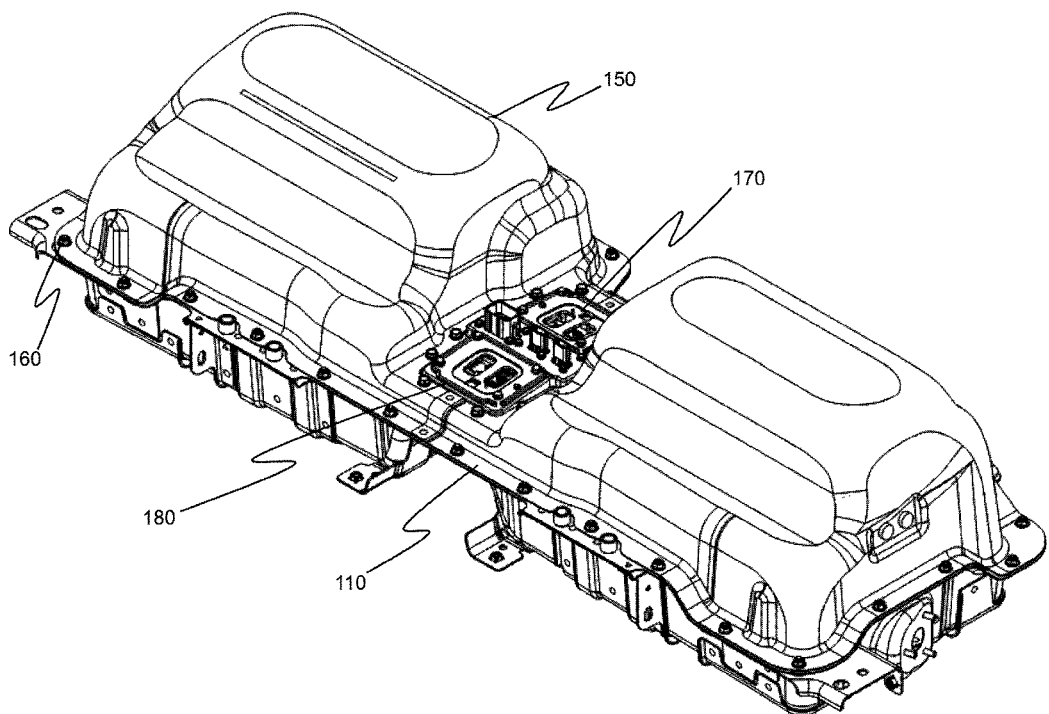

BATTERY PACK COMPRISING BATTERY MODULES MOUNTED IN TWO LAYERS

TECHNICAL FIELD

This application claims priority to and the benefit of Korean Patent Application No. 10-2016-0005055 filed in the Korean Intellectual Property Office on Jan. 15, 2016, the entire contents of which are incorporated herein by reference.

The present invention relates to a battery pack including battery modules mounted in two layers.

BACKGROUND ART

Recently, as technology development and demand for mobile devices have increased, there has been a rapid increase in demand for secondary batteries capable of charging and discharging as energy sources, and thus a lot of research has been conducted on secondary batteries capable of satisfying various demands. In addition, the secondary battery has received attention as a power source of an electric vehicle (EV), a hybrid electric vehicle (HEV), a plug-in hybrid electric vehicle (PLUG-IN HEV), etc., that are suggested as a solution to solve the air pollution of existing gasoline vehicles and diesel vehicles using fossil fuels.

Thus, an electric vehicle (EV) that is able to be operated only by a battery, a hybrid electric vehicle (HEV) that uses the battery in combination with an existing engine, etc., have been developed, and some of the vehicles have been commercially available. A nickel-metal hydride (Ni-MH) secondary battery is mainly used among the secondary battery as power sources for EV, HEV, etc. However, researches using lithium secondary batteries having high energy density, high discharge voltage, and output stability have been actively conducted, and some are in the stage of commercialization.

When the secondary battery is used as the power source of the vehicle, the secondary battery is used in the form of a battery pack including a plurality of battery modules or a battery module assembly.

However, since the battery pack for a vehicle is generally electrically connected to each device while being mounted in an internal space such as a trunk, it occupies an excessively large space in the vehicle, and thus there is a limit to fully utilizing the internal space of the vehicle.

Therefore, there is a high need for a technique capable of fundamentally solving these problems.

DISCLOSURE

Technical Problem

The present invention has been made in an effort to solve the above-described problems of the conventional art and technical problems required from the past.

The present inventors conducted intensive research and various experiments, and as described below, found that a battery pack including battery modules having a structure in which at least one battery module has a layer structure with the remaining battery modules based on the ground, could variously constitute a size, a shape, and a structure of the battery pack, and thus in devices such as a vehicle, etc., limitation on a mounting position of the battery pack could be overcome, volume of the battery pack relative to capacity could be minimized, and space utilization of the device could be maximized, and completed the present invention.

Technical Solution

An exemplary embodiment of the present invention provides a plurality of battery modules each including a plurality of battery cells, wherein at least one of the battery modules has a layer structure with the remaining battery modules based on the ground;

a battery management system (BMS) mounted adjacent to the battery modules and monitoring and controlling operation of the battery modules;

a battery disconnect unit (BDU) mounted adjacent to the battery modules and controlling electrical connection of the battery modules;

a base plate having a structure in which the battery modules are mounted on an upper surface thereof and a lower end part thereof is fixed to an external device; and a pack cover surrounding the battery modules and coupled to an outer periphery of the base plate.

Thus, the battery pack according to the present invention includes the battery modules having a structure in which at least one battery module has a layer structure with the remaining battery modules based on the ground, thereby variously constituting a size, a shape, and a structure of the battery pack, and thus in devices such as a vehicle, etc., limitation on a mounting position of the battery pack may be overcome, volume of the battery pack relative to capacity may be minimized, and space utilization of the device may be maximized.

According to an embodiment of the present invention, the layer structure of the battery modules may include a first battery module unit including the two or more battery modules and fixed to the base plate, and a second battery module unit including the one or more battery modules and mounted on an upper end of the first battery module unit.

Here, the battery modules in the first battery module unit may be arranged to each other so that each battery cell has the same orientation The battery pack having the above-described structure is placed at a lower end part of a seat of a device such as a vehicle in a plane so as to balance a weight applied to both sides of the device, and thus it is possible to more easily perform mechanical design of the device in consideration of the weight applied by the battery pack.

More specifically, the first battery module unit may include a first battery module group and a second battery module group that are separated and arranged on both left and right sides based on a center part of the base plate.

Further, the second battery module unit may be mounted in a layer structure at an upper end of the first battery module group, and the BMS and the BDU may be mounted in a layer structure at an upper end of the second battery module group, and thus the weight applied to both the right and left sides of the device such as the vehicle, or the like, may be balanced.

According to another exemplary embodiment of the present invention, the second battery module unit may be mounted at a position deviated from the upper end of the first battery module group toward one side end thereof, and the BMS and the BDU may be mounted at a position deviated from the upper end of the second battery module group toward one side end thereof. For example, it may be constituted in a structure in which the battery pack is mounted at a lower end of a back seat of a device such as a vehicle, or the like, and some battery modules and electrical component members such as BMS and BDU, etc., protrude toward an upper end of the battery pack.

Meanwhile, the battery pack according to the present invention may have a structure in which an external input/output terminal for electrical connection with an external device is placed at the center part of the base plate.

Specifically, an opening may be formed in a portion of the pack cover at a position corresponding to the external input/output terminal, and the external input/output terminal may be exposed to the outside through the opening of the pack cover.

Generally, the battery cells constituting the battery modules may have a structure in which a plurality of pouch-shaped battery cells having a plate-shaped structure are arranged in a stacked manner, and in this structure, in order to achieve the layer structure as described above, it is preferable to constitute different structures in differently arranged directions.

According to an exemplary embodiment of the present invention, the battery cells in the battery module of the first battery module unit may be arranged adjacent in a vertical direction to the ground, and the battery cells in the battery module of the second battery module unit may be stacked in a horizontal direction to the ground.

More specifically, the first battery module unit may include 2 to 6 battery modules each including 12 to 24 battery cells, and the second battery module unit may include 1 or 2 battery module(s) each including 12 to 24 battery cells.

Here, the number of battery cells of each battery module constituting the first battery module unit may be relatively larger than the number of battery cells of each battery module constituting the second battery module unit.

Accordingly, in the case of the first battery module unit fixed to the base plate, the battery cells having the same width may be arranged adjacent in a vertical direction to the ground, and thus the number of battery cells arranged according to the width of the device may be adjusted. In the case of the second battery module unit mounted in the layer structure at the upper end of the first battery module unit, the battery cells having the same thickness may be stacked in the horizontal direction to the ground, and the number of battery cells arranged may be adjusted, thereby preventing a height of the battery pack from increasing excessively.

Meanwhile, the first battery module unit and the second battery module unit may include various forms of cooling members depending on the structure in which the battery cells are arranged.

Specifically, the first battery module unit may include a first cooling member, and the second battery module unit may include a second cooling member in which a thermal conduction direction is different from that of the first cooling member.

According to an exemplary embodiment of the present invention, the first cooling member may include first cooling fins interposed between the battery cells, respectively; and a first heat dissipating plate that is in thermal contact with one side ends of the first cooling fins and that is provided with a coolant flow path having a hollow structure for flow of the coolant and is placed between the first battery module unit and the base plate.

Here, the first heat dissipating plate of the first coolant member may have a coolant inlet formed at one side end and a coolant outlet formed at the other side end.

According to another exemplary embodiment of the present invention, the second cooling member may include second cooling fins interposed between the battery cells, respectively; and a second heat dissipating plate that is in thermal contact with one side ends of the second cooling fins, provided with a coolant flow path having a hollow structure for flow of the coolant, and mounted in a vertical direction to the ground.

Here, the second heat dissipating plate of the second cooling member may have a structure in which the coolant inlet and the coolant outlet are formed in a direction of an inner side surface of the second heat dissipating plate at the central part of the base plate.

In addition, the first cooling member may have a thermal pad interposed on a surface contacting the first battery module unit, and the second cooling member may have a thermal pad interposed on a surface contacting the second battery module unit.

That is, the first cooling member and the second cooling member having the above-described structure as differentiated may be constituted in which different types of cooling members are formed depending on the arrangement direction of the battery cells constituting the battery module between the base plate and the battery modules or between the BMS and BDU and the battery modules inside the battery pack, thereby utilizing the space inside the battery pack.

Meanwhile, the battery modules may be formed with module terminals for electrical connection at one side end and the other end side that are adjacent to each other, respectively, and the module terminals may be connected by a bus bar, respectively.

More specifically, the battery modules constituting the battery pack according to the present invention may include module terminals for mutual electrical connection.

In this case, the module terminals of each of the battery modules may be placed at one side end and the other side end that are adjacent to each other, respectively, and thus the module terminals may be electrically connected more simply by a bus bar having a smaller size, and accordingly, it is possible to further simplify an entire connection structure of the battery pack.

For reference, the battery cell may be a lithium ion battery cell or a lithium ion polymer battery cell, and the secondary battery may include a cathode, an anode, a separator, and a non-aqueous electrolyte solution containing a lithium salt.

The cathode may be prepared, for example, by applying a mixture of a cathode active material, a conductive material, and a binder on a cathode current collector, followed by drying. If required, a filler may be further added to the mixture.

Examples of the cathode active material may include layered compounds including lithium cobalt oxide (LiCoO$_2$), lithium nickel oxide (LiNiO$_2$), and the like, or compounds substituted with one or more transition metals; lithium manganese oxides represented by Chemical Formula Li$_{1+x}$Mn$_{2-x}$O$_4$ wherein x is 0 to 0.33, LiMnO$_3$, LiMn$_2$O$_3$, LiMnO$_2$, etc.; lithium copper oxides (Li$_2$CuO$_2$); vanadium oxides such as LiV$_3$O$_5$, LiFe$_3$O$_4$, V$_2$O$_5$, Cu$_2$V$_2$O$_7$, etc.; Ni-site type lithium nickel oxides represented by Chemical Formula LiNi$_{1-x}$M$_x$O$_2$ wherein M is Co, Mn, Al, Cu, Fe, Mg, B or Ga, and x is 0.01 to 0.3; lithium manganese complex oxides represented by LiMn$_{2-x}$M$_x$O$_2$ wherein M is Co, Ni, Fe, Cr, Zn or Ta, and x is 0.01 to 0.1 or Li$_2$Mn$_3$MO$_5$ wherein M is Fe, Co, Ni, Cu or Zn; LiMn$_2$O$_4$ in which a part of Li in the Chemical Formula is substituted with an alkaline earth metal ion; disulfide compounds; Fe$_2$(MoO$_4$)$_3$, etc., but the cathode active material is not limited thereto.

The conductive material is generally added in an amount of 1 to 30 wt % based on the total weight of the mixture including the cathode active material. The conductive material is not particularly limited as long as it has electrical conductivity without causing a chemical change in the battery. Examples of the conductive material may include graphite such as natural graphite, and artificial graphite, or the like; carbon black such as carbon black, acetylene black, Ketjen black, channel black, furnace black, lamp black, and summer black, or the like; conductive fiber such as carbon fiber, metal fiber, or the like; metal powder such as carbon fluoride, aluminum, nickel powder, or the like; conductive whisker such as zinc oxide, potassium titanate, or the like; conductive metal oxide such as titanium oxide, or the like; conductive material such as polyphenylene derivative, or the like, may be used.

The binder is a component which assists in bonding of the active material and the conductive material, etc., and bonding to the current collector, and is generally added in an amount of 1 to 30 wt % based on the total weight of the mixture containing the cathode active material. Examples of the binder may include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers, etc.

The filler is optionally used as a component for suppressing expansion of the cathode, and is not particularly limited as long as it is a fibrous material without causing a chemical change in the battery. Examples of the filler may include olefin-based polymers such as polyethylene, polypropylene, etc.; fibrous materials such as glass fibers and carbon fibers, etc.

The anode may be manufactured by applying an anode active material on an anode current collector, followed by drying. If required, the above-described components may be optionally included.

Examples of the anode active material may include carbons such as non-graphitized carbon, graphite carbon, etc.; metal complex oxides such as $Li_xFe_2O_3 (0 \leq x \leq 1)$, $Li_xWO_2$ $(0 \leq x \leq 1)$, $Sn_xMe_{1-x}Me'_yO_z$ (Me: Mn, Fe, Pb, Ge; Me': Al, B, P, Si, Group 1, Group 2 and Group 3 elements in the Periodic Table, halogen; $0 < x \leq 1$; $1 \leq y \leq 3$; $1 \leq z \leq 8$), etc.; lithium metals; lithium alloys; silicon-based alloys; Tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, etc.; conductive polymers such as polyacetylene, etc.; Li—Co—Ni-based materials, etc.

The separator is interposed between the cathode and the anode, and as the separator, an insulating thin film having high ion permeability and mechanical strength is used. The separator generally has a pore diameter of 0.01 to 10 μm and generally has a thickness of 5 to 300 μm. As the separator, for example, olefin-based polymers such as polypropylene having chemical resistance and hydrophobicity; a sheet or a non-woven fabric, etc., that is made of glass fiber, polyethylene, or the like, is used. When a solid electrolyte such as a polymer is used as the electrolyte, the solid electrolyte may also serve as the separator.

The non-aqueous electrolyte solution containing a lithium salt may include a polar organic electrolyte solution and a lithium salt. As the electrolyte solution, a non-aqueous liquid electrolyte solution, an organic solid electrolyte, an inorganic solid electrolyte, etc., are used.

Examples of the non-aqueous liquid electrolyte solution may include aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivative, sulfolane, methyl sulfolane, 1,3-dimethyl-2-imidazolidinone, propylene carbonate derivative, tetrahydrofuran derivative, ether, methyl pyrophosphate, ethyl propionate, etc.

Examples of the organic solid electrolyte may include polyethylene derivatives, polyethylene oxide derivatives, polypropylene oxide derivatives, phosphate ester polymers, poly agitation lysine, polyester sulfide, polyvinyl alcohol, polyvinylidene fluoride, and polymers including an ionic dissociation group, etc.

Examples of the inorganic solid electrolyte may include Li nitrides, Li halides, Li sulfates such as $Li_3N$, LiI, $Li_5NI_2$, $Li_3N$—LiI—LiOH, $LiSiO_4$, LiOH, $Li_2SiS_3$, $Li_4SiO_4$, $Li_3PO_4$—$Li_2S$—$SiS_2$, etc.

The lithium salt is a material that is favorable to be dissolved in the non-aqueous electrolyte. For example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carbonic acid lithium, 4 phenyl boric acid lithium, imide, etc., may be used.

Further, for the purpose of improving charge/discharge characteristics, flame retardancy, etc., for example, pyridine, triethylphosphite, triethanolamine, cyclic ether, ethylene diamine, n-glyme, hexaphosphoric triamide, nitrobenzene derivative, sulfur, quinone imine dye, N-substituted oxazolidinone, N,N-substituted imidazolidine, ethylene glycol dialkyl ether, ammonium salt, pyrrole, 2-methoxy ethanol, aluminum trichloride, etc., may be added to the non-aqueous electrolyte solution. In some cases, a halogen-containing solvent such as carbon tetrachloride or ethylene trifluoride may be further added to impart nonflammability, or carbon dioxide gas may be further added to improve high temperature storage characteristic.

Another embodiment of the present invention provides a device including the battery pack as described above, wherein the device may be an electric vehicle, a hybrid electric vehicle, or a plug-in hybrid electric vehicle, but is not limited thereto.

Structures of these devices and manufacturing methods thereof are well known in the art, and thus a detailed description thereof will be omitted herein.

DESCRIPTION OF THE DRAWINGS

FIG. 1 is a schematic view schematically showing a structure in which battery modules are mounted in a battery pack according to an exemplary embodiment of the present invention;

FIG. 2 is a schematic view showing a structure of a first battery module unit of FIG. 1;

FIG. 3 is a schematic view showing a two layer structure of a battery module of FIG. 1;

FIG. 4 is a schematic view showing a structure of the battery module constituting the first battery module unit according to an exemplary embodiment of the present invention;

FIG. 5 is a schematic view showing a structure of a battery module constituting a second battery module unit according to an exemplary embodiment of the present invention; and FIG. 6 is a schematic view showing a structure of a battery pack in which a pack cover is coupled in a state in which the battery modules of FIG. 1 are embedded.

MODE FOR INVENTION

Hereinafter, exemplary embodiments of the present invention will be described with reference to the drawings, but these are provided for better understanding of the present invention. Thus, the present invention is not limited by the scope of the present invention.

FIG. 1 is a schematic view schematically showing a structure in which battery modules are mounted in a battery pack according to an exemplary embodiment of the present invention, FIG. 2 is a schematic view showing a structure of a first battery module unit of FIG. 1, and FIG. 3 is a schematic view showing a two layer structure of a battery module of FIG. 1.

First, referring to FIG. 1, the battery pack 100 includes a base plate 110 having a structure in which the battery modules (see FIGS. 4 and 5) are mounted on an upper surface thereof and a lower end part thereof is fixed to an external device.

A first battery module unit 120 is mounted on an upper end of the base plate 110. At an upper end of the first battery module group 121 placed on the left side based on the center part of the base plate 110 in the first battery module unit 120, a second battery module unit 130 is mounted in a layer structure.

Further, at an upper end of the second battery module group 122 placed on the right side based on the center part of the base plate 110 in the first battery module unit 120, an electrical component member 140 including a battery management system (BMS) and a battery disconnect unit (BDU) is mounted in a layer structure.

Next, referring to FIG. 2, the first battery module unit 120 composed of a total of six battery modules, is fixed to the upper end of the base plate 110 while being mounted thereon, and the first battery module group 121 composed of a total of three battery modules is placed on the left side based on the center part of the base plate 110 and the second battery module group 122 composed of a total of three battery modules is placed on the right side based on the center part of the base plate 110.

Next, the two layer structure of the battery module is described in more detail with reference to FIG. 3. At an upper end of the first battery module group 121 composed of a total of three battery modules on the left side based on the center part of the base plate 110, the second battery module unit 130 is mounted in a layer structure.

Here, the second battery module unit 130 is mounted at a position deviated toward one side end of the first battery module group 121 forming a relatively large area.

Further, as shown in FIG. 1, at an upper part of the second battery module group 122, which is composed of a total of three battery modules on the right side based on the center part of the base plate 110 and forms a relatively large area, the electrical component member 140 including the BMS and the BDU may be mounted at a position deviated toward one side end.

In this structure, additional members such as an additional battery module or an electrical component member for controlling an operation of the battery pack may be mounted at a portion A deviated toward one side end based on the upper end of the second battery module group 122, and the remaining portion B except for the portion A may be utilized as a surplus space which does not occupy volume of the battery pack.

In the above-described structure, the second battery module unit 130 and the electrical component member 140 mounted on the upper ends of the first battery module group 121 and the second battery module group 122 may have the same protrusion height, and a size, a shape, and a structure of the battery pack 100 may be more variously constituted through the structure. Accordingly, in devices such as a vehicle, etc., limitation on a mounting position of the battery pack 100 may be overcome, volume of the battery pack 100 relative to capacity may be minimized, and space utilization of the device may be maximized.

FIG. 4 is a schematic view showing a structure of the battery module constituting the first battery module unit according to an exemplary embodiment of the present invention, and FIG. 5 is a schematic view showing a structure of the battery module constituting the second battery module unit according to an exemplary embodiment of the present invention.

First, referring to FIG. 4 together with FIGS. 2 and 3, the battery modules 200 included in the first battery module unit 120 which is mounted on the upper end of the base plate 110 and constitutes one layer structure are arranged to each other so that the battery cells have the same orientation.

Specifically, the battery module 200 has a structure in which the battery cells are arranged adjacent in a vertical direction to the ground, and includes a cooling member (not shown) at the lower end of the battery module 200.

Next, referring to FIG. 5 together with FIGS. 2 and 3, the battery modules 300 included in the second battery module unit 130 which is mounted in a layer structure on the upper end of the first battery module unit 120 are arranged to each other so that the battery cells have the same orientation.

Specifically, the battery module 300 has a structure in which the battery cells are stacked in a horizontal direction to the ground, and includes a cooling member (not shown) on one side surface of the battery module 300.

Therefore, each of the battery modules 200 and 300 constituting the first battery module unit 120 and the second battery module unit 130 has a structure in which the arrangement direction and the lamination structure of the battery cells are different, and thus the mounting position of the cooling member may be different, thereby easily utilizing the space inside the battery pack 100.

FIG. 6 is a schematic view showing a structure of a battery pack in which a pack cover is coupled in a state in which the battery modules of FIG. 1 are embedded.

Referring to FIG. 6, the pack cover 150 is coupled to an outer periphery of the base plate 110 by a plurality of fastening members 160 in a state in which the battery modules are embedded.

An upper end of the pack cover 150 protrudes at a position corresponding to the battery module or the electric component member placed inside the pack cover. An opening 180 is formed at a position corresponding to the external input/output terminal 170 in the center part of the pack cover 150, and the external input/output terminal 170 is exposed to the outside through the opening 180.

Therefore, the external input/output terminal 170 is formed at a portion where the battery module is not placed, and thus the space may be utilized efficiently, and the external input/output terminal 170 protrudes to the outside, and thus electrical connection may be easily performed.

It will be appreciated by those skilled in the art that various modifications and change can be made without departing from the spirits and scope of the appended claims of the present invention.

INDUSTRIAL APPLICABILITY

As described above, the battery pack according to the present invention may include battery modules having a structure in which at least one battery module has a layer structure with the remaining battery modules based on the ground, thereby variously constituting a size, a shape, and a structure of the battery pack, and thus in devices such as a vehicle, etc., limitation on a mounting position of the battery pack may be overcome, volume of the battery pack relative to capacity may be minimized, and space utilization of the device may be maximized.

The invention claimed is:

1. A battery pack comprising:
a plurality of battery modules each including a plurality of battery cells, wherein at least one of the battery modules has a two layer structure with remaining battery modules of the plurality of battery modules based on a horizontal plane;
a battery management system (BMS) mounted adjacent to the battery modules and monitoring and controlling operation of the battery modules;
a battery disconnect unit (BDU) mounted adjacent to the battery modules and controlling electrical connection of the battery modules;
a base plate having a structure in which the remaining battery modules are mounted on an upper surface thereof and a lower end part thereof is configured to be fixed to an external device; and
a pack cover surrounding the battery modules and coupled to an outer periphery of the base plate,
wherein the two layer structure of the battery modules includes a first battery module unit including two or more battery module groups fixed to the base plate, the first battery module group and the secondary battery module group being spaced from each other and arranged on opposite sides of the upper surface of the base plate based on a center part of the base plate,
wherein a second battery module unit including at least one battery module is mounted on an upper end of the first battery module group, and
wherein the BMS and the BDU are mounted adjacent each other in a layer on an upper end of the secondary battery module group such that weight applied by the battery modules, BMS and BDU are balanced on the opposite sides of the upper surface of the base plate.

2. The battery pack of claim 1, wherein:
the battery modules in the first battery module unit are arranged to each other so that each battery cell has a same orientation.

3. The battery pack of claim 1, wherein:
the second battery module unit is mounted at a position deviated from the upper end of the first battery module group toward one side end thereof, and the BMS and the BDU are mounted at a position deviated from the upper end of the second battery module group toward one side end thereof.

4. The battery pack of claim 1, wherein:
an external input/output terminal for electrical connection with an external device is placed at the center part of the base plate.

5. The battery pack of claim 4, wherein:
an opening is formed in a portion of the pack cover at a position corresponding to the external input/output terminal, and the external input/output terminal is exposed outside the pack cover through the opening of the pack cover.

6. The battery pack of claim 1, wherein:
the battery cells in the battery module of the first battery module unit are arranged adjacent in a vertical direction to the horizontal plane, and the battery cells in the battery module of the second battery module unit are stacked in a horizontal direction to the horizontal plane.

7. The battery pack of claim 6, wherein:
the first battery module unit includes a first cooling member, and the second battery module unit includes a second cooling member in which a heat conduction direction is different from that of the first cooling member.

8. The battery pack of claim 7, wherein:
the first cooling member includes
first cooling fins interposed between the battery cells, respectively; and
a first heat dissipating plate that is in thermal contact with one side ends of the first cooling fins, provided with a coolant flow path having a hollow structure for flow of the coolant, and placed between the first battery module unit and the base plate.

9. The battery pack of claim 8, wherein:
the first heat dissipating plate of the first coolant member has a coolant inlet formed at one side end and a coolant outlet formed at another side end.

10. The battery pack of claim 7, wherein:
the second cooling member includes
second cooling fins interposed between the battery cells, respectively; and
a second heat dissipating plate that is in thermal contact with one side ends of the second cooling fins, provided with a coolant flow path having a hollow structure for flow of the coolant, and mounted in a vertical direction to the ground.

11. The battery pack of claim 10, wherein:
the second heat dissipating plate of the second cooling member has a structure in which the coolant inlet and the coolant outlet are formed in a direction of an inner side surface of the second heat dissipating plate at the center part of the base plate.

12. The battery pack of claim 7, wherein:
the first cooling member has a thermal pad interposed on a surface contacting the first battery module unit, and the second cooling member has a thermal pad interposed on a surface contacting the second battery module unit.

13. The battery pack of claim 1, wherein:
the first battery module unit includes 2 to 6 battery modules each including 12 to 24 battery cells, and the second battery module unit includes 1 or 2 battery module(s) each including 12 to 24 battery cells.

14. The battery pack of claim 13, wherein:
a number of battery cells of each battery module constituting the first battery module unit is relatively larger than a number of battery cells of each battery module constituting the second battery module unit.

15. The battery pack of claim 1, wherein:
the battery modules are formed with module terminals for electrical connection at one side end and another side end that are adjacent to each other, respectively, and the module terminals are connected by a bus bar, respectively.

16. A device comprising the battery pack of claim 1.
17. The device of claim 16, wherein:
the device is any one selected from the group consisting of an electric vehicle, a hybrid electric vehicle, and a plug-in hybrid electric vehicle.

* * * * *